(12) United States Patent
Rhodes et al.

(10) Patent No.: US 10,952,366 B2
(45) Date of Patent: Mar. 23, 2021

(54) SEED POSITIONING DEVICE, SEED DISPENSING SYSTEM, AND METHOD OF DISPENSING SEED

(71) Applicant: DEERE & COMPANY, Moline, IL (US)

(72) Inventors: Michael L. Rhodes, Richfield, MN (US); Kevin P. Cowles, Fargo, ND (US)

(73) Assignee: Deere & Company, Moline, IL (US)

( * ) Notice: Subject to any disclaimer, the term of this patent is extended or adjusted under 35 U.S.C. 154(b) by 175 days.

(21) Appl. No.: 16/176,790

(22) Filed: Oct. 31, 2018

(65) Prior Publication Data
US 2020/0128725 A1   Apr. 30, 2020

(51) Int. Cl.
*A01C 7/12* (2006.01)
*A01C 7/16* (2006.01)

(52) U.S. Cl.
CPC .............. *A01C 7/12* (2013.01); *A01C 7/163* (2013.01)

(58) Field of Classification Search
CPC ..... A01C 7/12; A01C 7/08; A01C 7/00; A01C 7/163; A01C 7/16
See application file for complete search history.

(56) References Cited

U.S. PATENT DOCUMENTS 6,148,748 A   11/2000   Bardi et al.

FOREIGN PATENT DOCUMENTS

WO   WO-2004004441 A1 *   1/2004   ............. A01C 7/081

* cited by examiner

*Primary Examiner* — Christopher J. Novosad

(57) ABSTRACT

A seed positioning device, a seed dispensing system, and a method of positioning a plurality of seeds may include an axially extending housing member having an upper portion and a lower portion. The seed positioning device further includes a seed positioning member extending axially through the housing member and being configured to transfer a plurality of seeds between the upper portion of the housing member and the lower portion of the housing member and position the plurality of seeds by centrifugal force.

14 Claims, 10 Drawing Sheets

SEED POSITIONING DEVICE, SEED DISPENSING SYSTEM, AND METHOD OF DISPENSING SEED

BACKGROUND

Seeding implements, such as air seeders, are commonly towed by tractors to apply seed, fertilizer, and/or other granules to a field. The ground speed of agricultural machinery has increased recently as such vehicles and machinery have become more efficient. In the case of seeding operations, increased ground speed results in a need for metering or singulating seeds at extremely high rates. However, conventional seed metering, dispensing, and/or sensing systems may produce significant inaccuracies with seed counting or volumetric sensing during the seeding operation due to the higher rates of operation. In particular non-limiting examples, seeds may pass through a seed sensor at random angles, speeds, and/or in clumps, thereby making the seeds difficult to resolve or obscuring some seeds from the sensor. As such, seed sensors may not accurately determine a volume or rate of seeds being delivered and/or seeds may not be properly delivered to the soil.

Accordingly, there is a need in the art for a seed positioning device, a seed dispensing system, and a method of dispensing seeds that present seeds to a sensor in a uniform manner, otherwise improve accuracy of volumetric measurement or counting of the seeds, and/or ensure proper delivery of seeds to the soil.

SUMMARY

Various aspects of examples of the present disclosure are set out in the claims.

According to a first aspect of the present disclosure, a seed positioning device is provided. The seed positioning device includes an axially extending housing member having an upper portion and a lower portion. The seed positioning device further includes a seed positioning member extending axially through the housing member and configured to transfer a plurality of seeds between the upper portion of the housing member and the lower portion of the housing member and position the plurality of seeds by centrifugal force.

According to a second aspect of the present disclosure, a seed dispensing system is provided. The seed dispensing system includes a seed sensor configured to detect a plurality of seeds passing therethrough for monitoring dispensed seed quantity. The seed dispensing system further includes a seed positioning device disposed above the seed sensor and configured to position the plurality of seeds by centrifugal force.

According to a third aspect of the present disclosure, a method of positioning a plurality of seeds is provided. The method includes providing a seed positioning device having a seed positioning member and a radially outer portion, receiving the plurality of seeds into an upper portion of the seed positioning device, urging the plurality of seeds toward the radially outer portion by centrifugal force, and dispensing the plurality of seeds from a lower portion of the seed positioning device.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one example embodiment of the subject matter of this disclosure is understood by referring to FIGS. 1 through 10 of the drawings.

Figure 1:
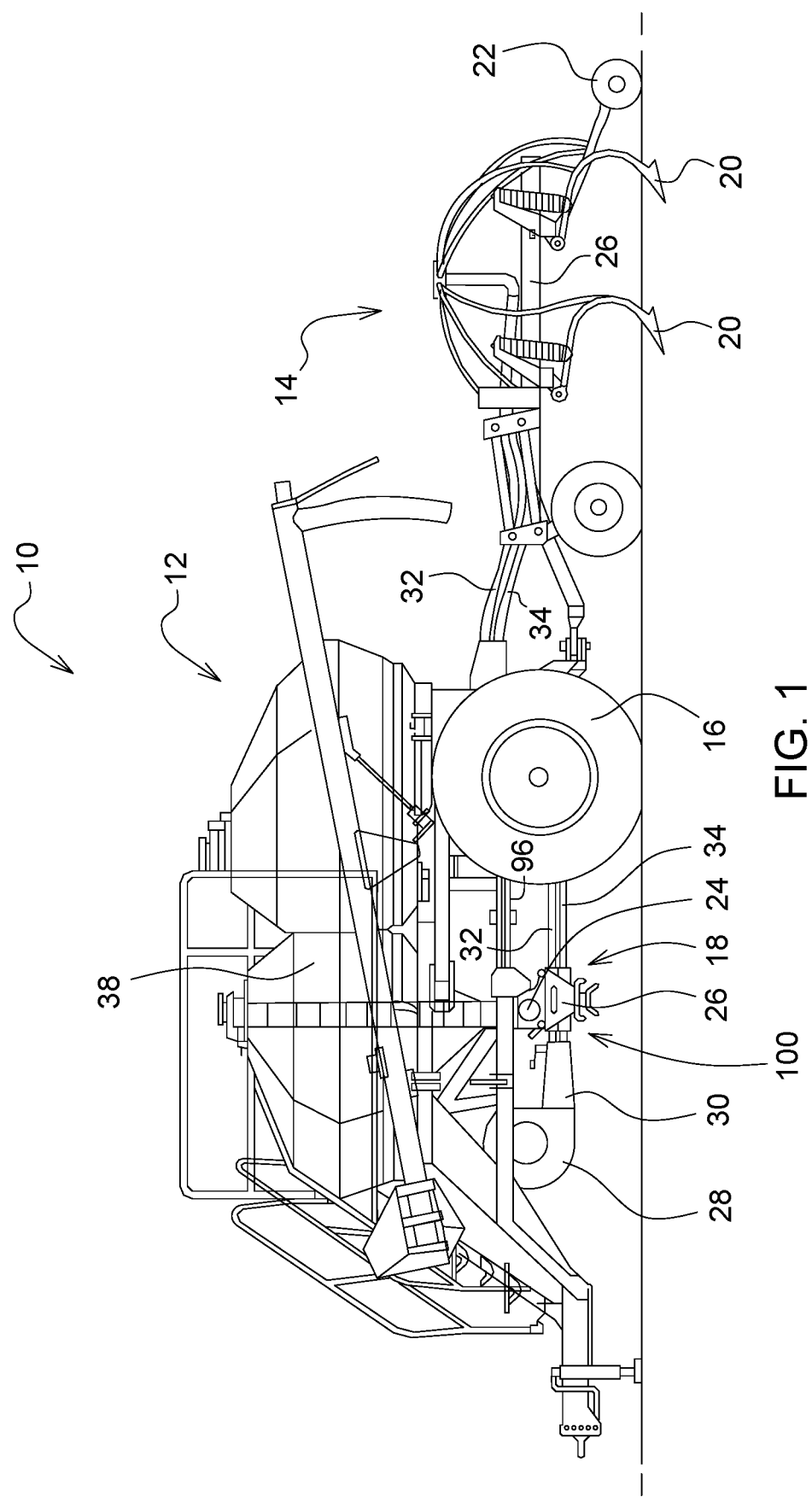
FIG. 1 is a side elevation view of a seeding vehicle in accordance with one or more embodiments of the present disclosure.

Reference is now made to FIG. 1 of the present disclosure, which illustrates a seeding machine 10 having a seed cart 12 and a tilling implement 14. The seeding machine 10 may include an air seeder and may be towed in combination with the tilling implement 14, one behind the other, to place seed, fertilizer, and/or another product on or under the surface of the soil. The seed cart 12 is typically towed by a tractor (not shown) through a field to be seeded. The seed cart 12 of an embodiment has a frame supporting a number of storage tanks 38 with wheels 16 rotatably mounted to the frame. Each storage tank 38 is associated with a volumetric meter 24. In at least one embodiment, the volumetric meter 24 measures a fixed volume of granular product, such as seed, fertilizer, or other substance, per unit of linear distance. Each volumetric meter 24 is positioned below the respective storage tank 38 and receives product therefrom for controlled feeding of the product into a pneumatic distribution system 18. The meter or meters 24 of one or more embodiments rotate to feed metered product into the pneumatic distribution system 18. The pneumatic distribution system 18 of an embodiment includes a blower to provide one or more airstreams through the pneumatic distribution system 18 to seed boots configured to deposit seed, fertilizer, or other product to the soil. Before being introduced into an airstream, a metered product may be passed through a sensor 102, described in further detail below, at a primary air distribution manifold. The product contained in the storage tanks 38 may include seed, fertilizer, and/or other granules or particles. Accordingly, the term "seed" and "seeding" as used herein includes seed, fertilizer, other granules, product, or particles, or combinations thereof.

The tilling implement 14, towed behind the seed cart 12 in the embodiment shown in FIG. 1, comprises a frame to which ground openers 20 are mounted. The tilling implement 14 may also include seed row finishing equipment, such as packers 22. Located below each volumetric meter 24 is a primary air distribution manifold 26, part of the pneumatic distribution system 18. The pneumatic distribution system 18 distributes metered product from the storage tanks 38 to the ground openers 20, and includes a blower 28 driven by a motor which directs a stream of pressurized air through an adjustable damper 30, which thereafter directs the air stream into a top rank portion 32 of first tubes and a bottom rank portion 34 of first tubes. FIG. 1 illustrates a double shoot air seeder wherein a first product contained in one of the storage tanks 38 is directed to the top rank portion 32 of the system 18 and a second product contained in the other of the storage tanks 38 is directed to the bottom rank portion 36 of the system 18. One of ordinary skill in the art will appreciate that the seeding machine 10 in accordance with one or more embodiments may include any particular configuration and/or be configured to direct the same product or any combination of multiple products through the system 18. The primary air distribution manifolds 26 may be configured to place product from both tanks 38 into the same rank of tubes for single shoot operation.

Figure 2:
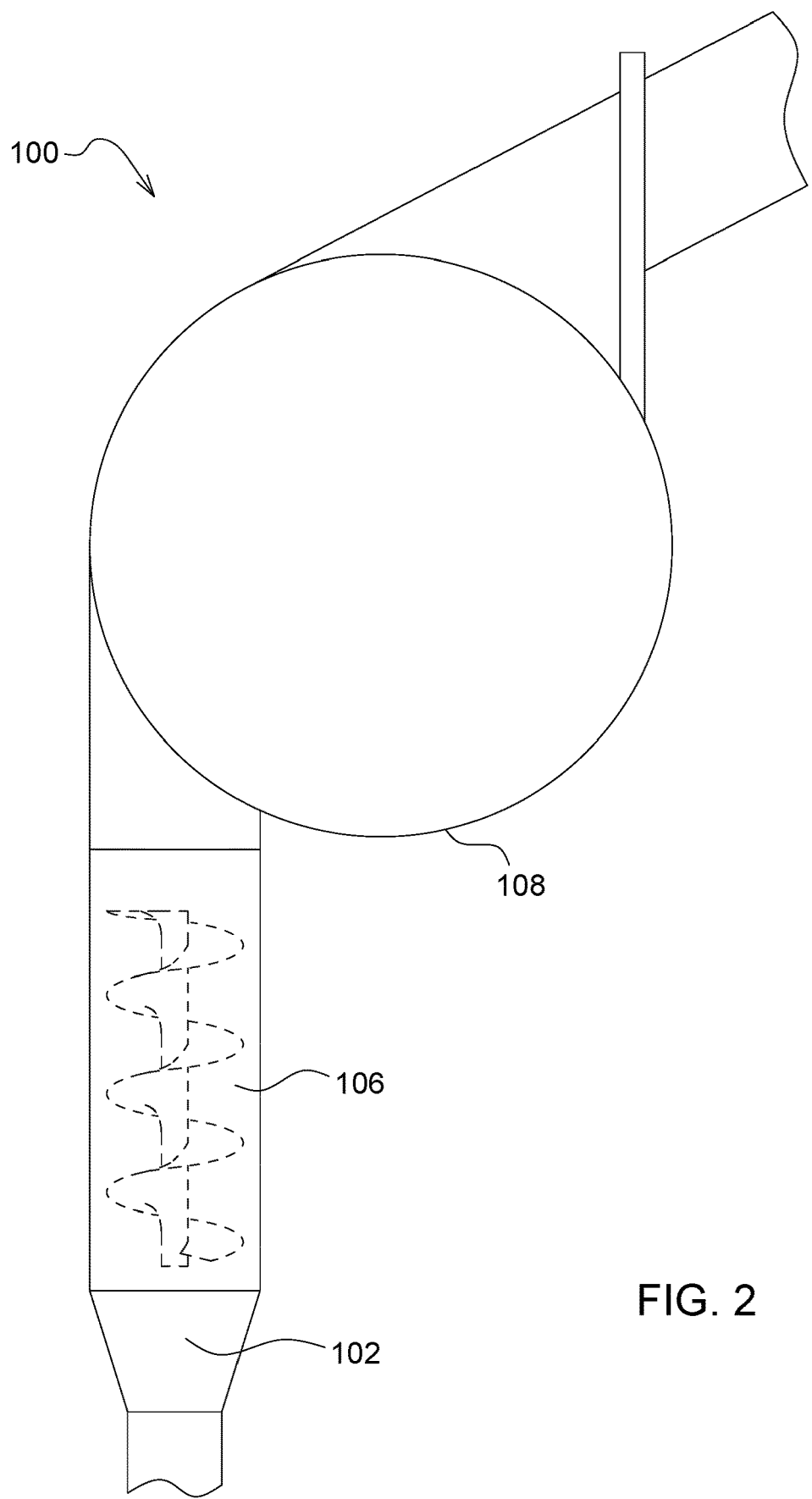
FIG. 2 illustrates a seed dispensing system in accordance with one or more embodiments of the present disclosure.

Referring now to FIG. 2, a seed dispensing system 100 is illustrated in accordance with an embodiment of the present disclosure. The system 100, or any individual portion thereof, is located below one or more of the storage tanks 38 in the illustrated embodiment, but may be located elsewhere, such as at the tilling implement 14 to name a non-limiting example. The system 100 includes a seed sensor 102 configured to detect seeds 104 passing therethrough for monitoring dispensed seed quantity. The system 100 further includes a seed positioning device 106 disposed above or upstream from the seed sensor 102 and configured to position the seeds 104 by centrifugal force, as will be explained in further detail below. The system 100 of an embodiment further includes a seed meter 108 configured to dispense the seeds 104 into the seed positioning device 106. The seed meter 108 may include the volumetric meter 24 or a separate meter spaced from the volumetric meter 24.

Figure 3:
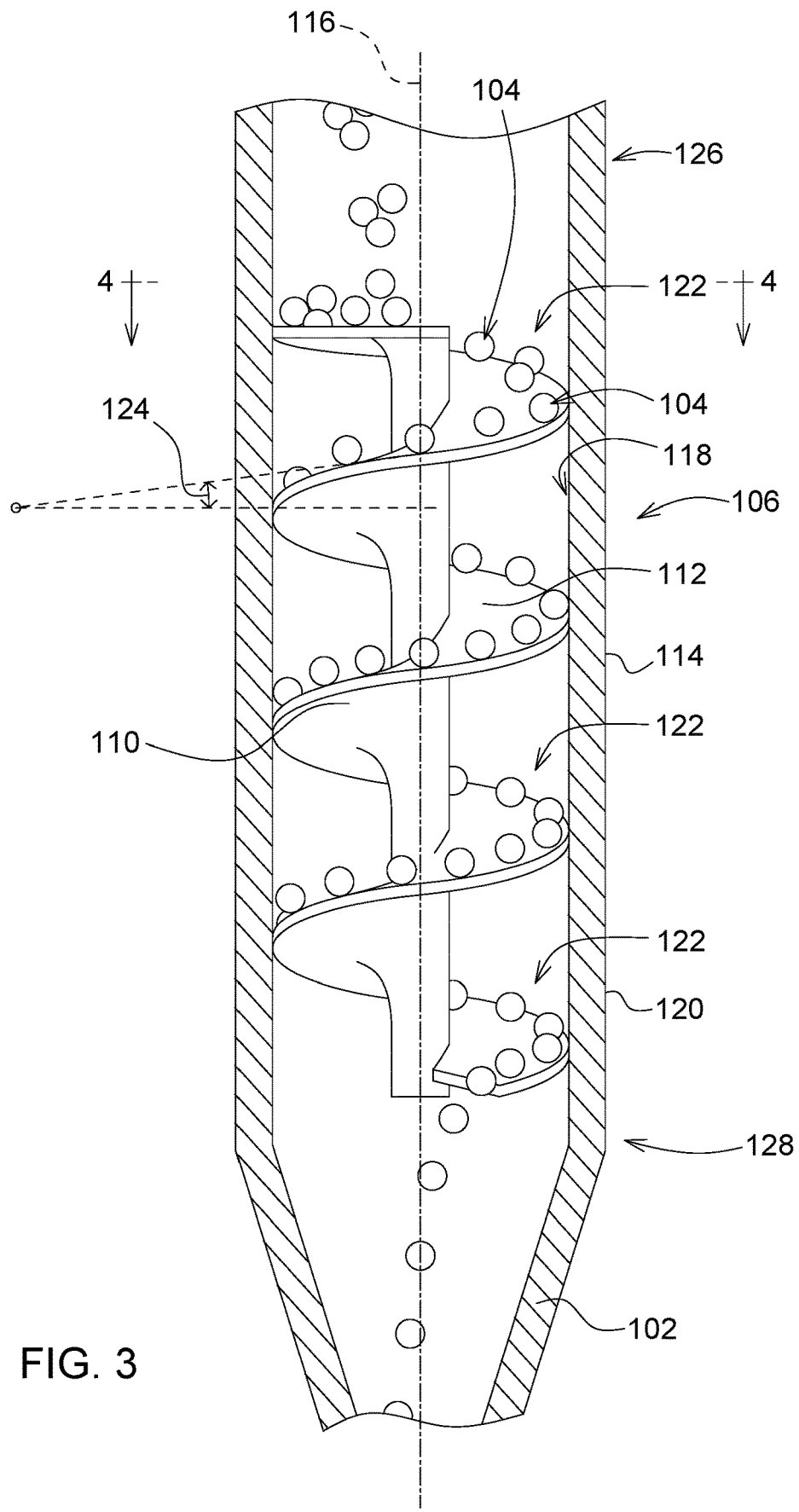
FIG. 3 is a cross-sectional view of a seed positioning device in accordance with one or more embodiments of the present disclosure.

Referring now to FIG. 3, a cross section of the seed positioning device 106 is illustrated in accordance with an embodiment. The seed positioning device 106 includes a seed positioning member 110 having a helical surface 112. The helical surface 112 of one or more embodiments of the present disclosure is formed as part of one or more helical, screw, spiral, flighted, or angled structures and/or one or more structures extending radially. As illustrated in FIG. 3, the helical surface 112 includes one or more axially overlapping portions 122. Although three axially overlapping portions 122 are shown in FIG. 3, the helical surface 112 includes any number of axially overlapping portions 122, or no axially overlapping portions 122, in additional embodiments. The helical surface 112 includes at least one overlapping portion 122 in an embodiment. The helical surface 112 includes a pitch angle 124 in a range of between 30 degrees and 60 degrees in the illustrated embodiment. In additional embodiments, the pitch angle 124 is in a range of between 10 and 80 degrees, includes values greater than 80 degrees or less than 10 degrees, and/or includes a varying pitch angle 124 and/or two or more pitch angles 124.

Although the embodiments illustrated in the Figures herein show generally round, spherical seeds 104, one will appreciate that the device 106 of any embodiment described herein may be utilized with oblong, irregular, or generally non-spherical seeds. In such embodiments, the helical surface 112 and/or another portion of the device 106 may operate to, among other things, align and/or control orientation of such seeds. In particular embodiments of the present disclosure, higher pitch angles 124 may be utilized for oblong, irregular, or generally non-spherical seeds 104, and lower pitch angles 124 may be utilized for generally spherical seeds 104 that are capable of rolling more easily than types of seeds 104 that are generally non-spherical. Further, to transfer seeds 104 of generally non-spherical seed type through the seed positioning device 106, air or another force may be utilized instead of or in addition to gravity in particular embodiments. Notwithstanding, air or another force may be utilized instead of or in addition to gravity to transfer seeds 104 of generally round or spherical seed type through the seed positioning device 106 in particular embodiments as well.

The seed positioning device 106 further includes an axially-extending housing member 114 having a central axis 116 and a radially outer portion 118. The housing member 114 further includes an upper portion 126 and a lower portion 128. The housing member 114 is configured as and/or includes a tubular portion 120 in the illustrated embodiment. The seed positioning member 110 extends radially from the central axis 116 to the radially outer portion 118 of the housing member 114 in the illustrated embodiment. Further, the seed positioning member 110 extends axially through the housing member 114. The seeds 104 are transferred between the upper portion 126 of the housing member 114 and the lower portion 128 of the housing member 114 on, by, or along the seed positioning member 110. The seeds 104 are positioned on, by, or along the seed positioning member 110 and urged, compelled, forced, or sent toward the outer portion 118 by centrifugal force. In one or more embodiments, one or more portions of the helical surface 112 are downwardly-angled or angled toward the lower portion 128 in the direction of the radially outer portion 118 from the central axis 116 to further urge or force the seeds 104 toward the outer portion 118 of the housing member 114.

In at least one embodiment of the present disclosure, the seeds 104 spiral downward as directed by the seed positioning device 106, which is substantially helical or spiral in one or more embodiments. The seeds 104 are accelerated by gravity or another force radially outward toward a wall 134 of the housing member 114 in one or more embodiments described herein. The housing member 114, at least in part, is generally cylindrical in at least one embodiment. A substantially spiral shape of the seed positioning device 106, according to at least one embodiment, tends to cause (e.g., or convert the gravitational or forced acceleration to) a centrifugal force to act upon the seeds 104 to prevent clumping of the seeds 104 along a lower seed path of greater outer radial arc of the seed positioning device 106 (e.g., toward a lower end of the seed positioning device 106), rather than an upper seed path of lesser inner radial arc (e.g., toward an upper end of the seed positioning device 106). In other words, the seeds 104 at an upper end of the seed positioning device 106 are generally located more radially inward (and clumped together) toward the central axis 116 of the seed positioning device 106, which is co-axial with the housing member 114 in the illustrated embodiment, than the seeds at a lower end (e.g., and spaced apart from each other by a difference or increase in the radial arc).

Figure 4:
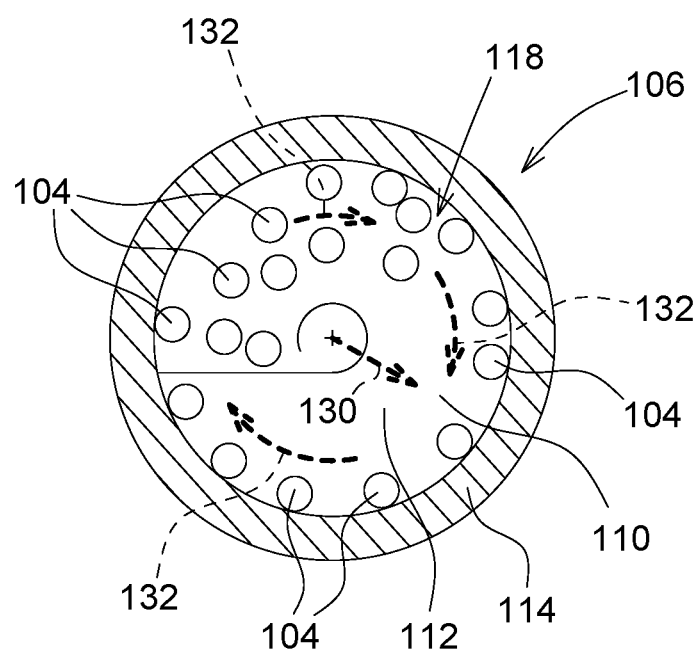
FIG. 4 is a top plan view of a seed positioning device in accordance with one or more embodiments of the present disclosure.

With continuing reference to FIG. 3, FIG. 4 is a top plan view of the seed positioning device 106 illustrating the seeds 104 falling by gravity or being sent or transferred, such as with the assistance with air propulsion, through the seed positioning device 106 via the helical surface 112 of the seed positioning member 110, as indicated by arrows 132. The centrifugal force, identified by arrow 130, urges, compels, force, or otherwise send the seeds 104 in an outward direction or toward the radially outer portion 118 of the housing member 114. Friction with the outer portion 118 of the housing member 114 and/or vibration of the device 106 causes separation or singulation of the seeds 104 and/or aligns or uniformly positions the seeds 104 at or along the outer portion 118 or other portion of the housing member 114 as the seeds 104 travel down or through the device 106. Such alignment or uniform positioning allow the seeds 104 to exit the device 106 at a predictable, consistent, and/or precise location with a predictable, consistent, and/or uniform velocity and/or singulation. Such alignment, positioning, and dispensing improve accuracy of the sensor 102 to determine seed count or volumetric flow and further improve seed placement or positioning from the device 106. In one or more embodiments of the present disclosure, the seeds 104 may travel through the seed positioning device 106 of the disclosed embodiments via gravity, air propulsion, and/or any other force. The use of physical location terms in the present disclosure may not limit such structures to any particular physical arrangement in embodiments of the present disclosure. For example, the term "upper" may refer to an upstream location in the system and is not necessarily limited to an element or location disposed physically above a reference location. In a similar example, the term "lower" may refer to a downstream location in the system and is not necessarily limited to an element or location disposed physically below a reference location.

Figure 5:
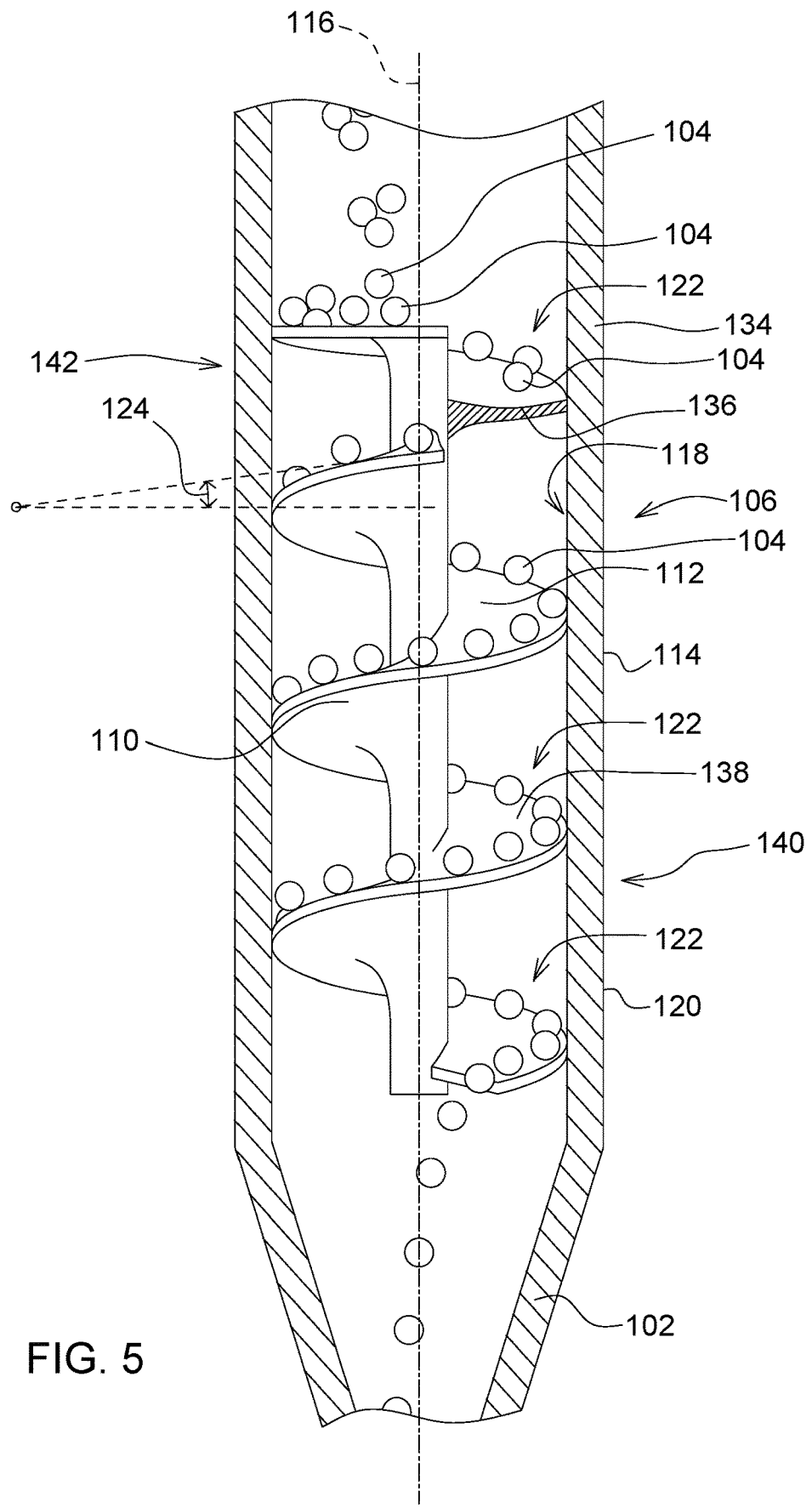
FIG. 5 is a cross-sectional view of a seed positioning device in accordance with one or more embodiments of the present disclosure.

Referring now to FIG. 5, in an additional or alternate embodiment of the present disclosure, the helical surface 112 of the seed positioning device 106 includes a groove 136, such as a U-shaped channel or other concavely depressed structure, to gradually direct the seeds 104 closer to the wall 134 as each seed 104 progresses downward in the seed positioning device 106. As shown in FIG. 5, the seeds 104 toward at a lower end 140 of the positioning device 106, as compared to the seeds 104 at an upper end 142 of the positioning device 106, will have greater velocity associated with greater centrifugal force and, hence, be forced upward and outward along a surface 138 of the groove 136.

Figure 6:
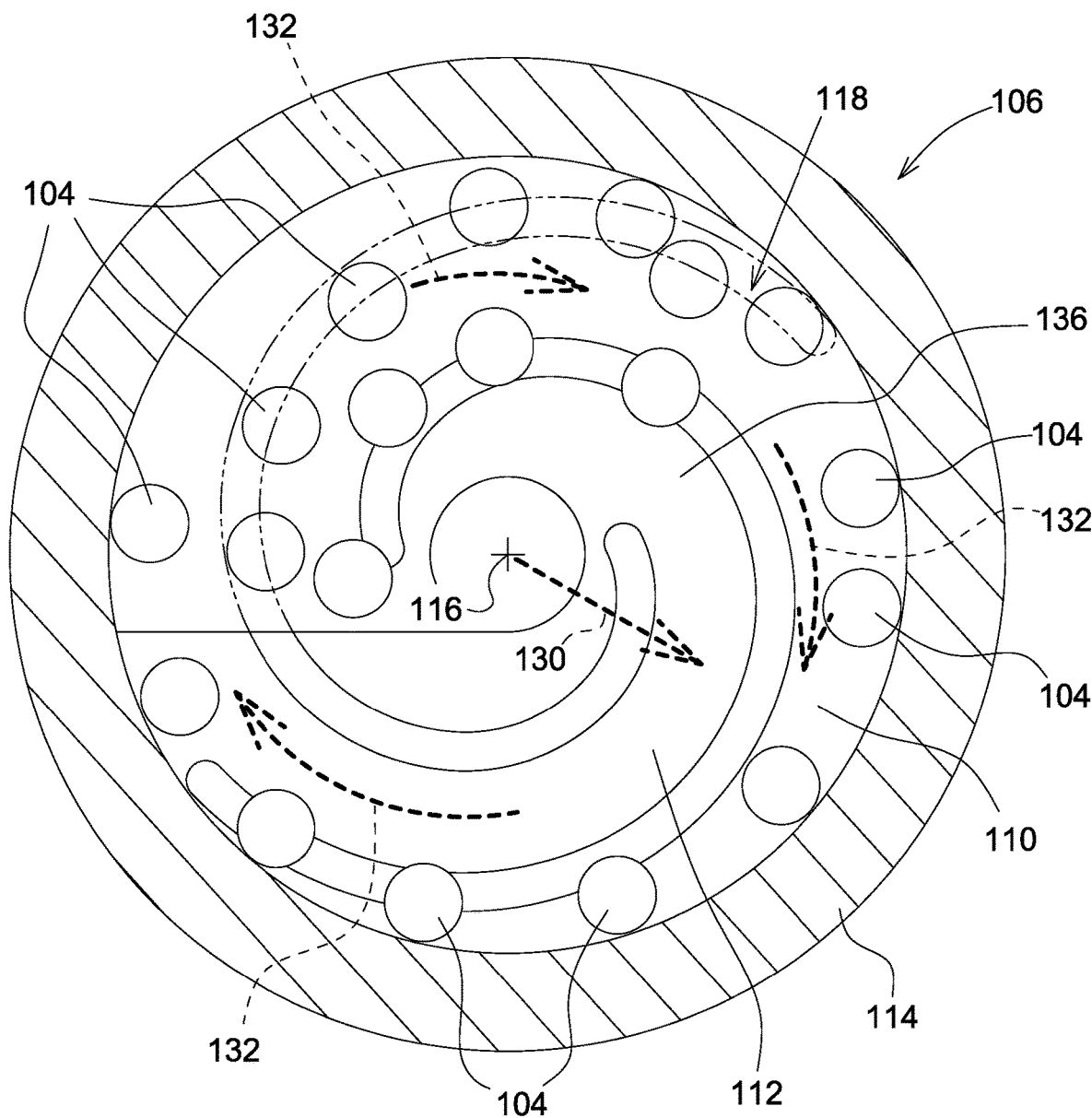
FIG. 6 is a top plan view of a seed positioning device in accordance with one or more embodiments of the present disclosure.

FIG. 6 illustrates a top plan view of the device 106 in accordance with another embodiment of the present disclosure. As shown in FIG. 6, the groove 136 at the lower end 140 of the seed positioning device 106, referenced in the embodiment of FIG. 5, is offset or skewed radially outward from the central axis 116 in the embodiment shown in FIG. 6 as compared to the groove 136 at or toward the upper end 142 of the positioning device 106, also referenced in the FIG. 5 embodiment. The seeds 104 in the FIG. 6 embodiment travel downward and are maintained at a radially inward location before being directed outward by the radially outward-extending groove 136 in cooperation with centrifugal force acting on the seeds 104. In an additional embodiment not illustrated, the groove 136 of the device 106 extends radially inwardly as the groove 136 extends down the device 106. In such an embodiment, like the effect described with respect to the embodiment of FIG. 7 below, the device 106 may increase speed and/or centrifugal force on the seeds 104.

Figure 7:
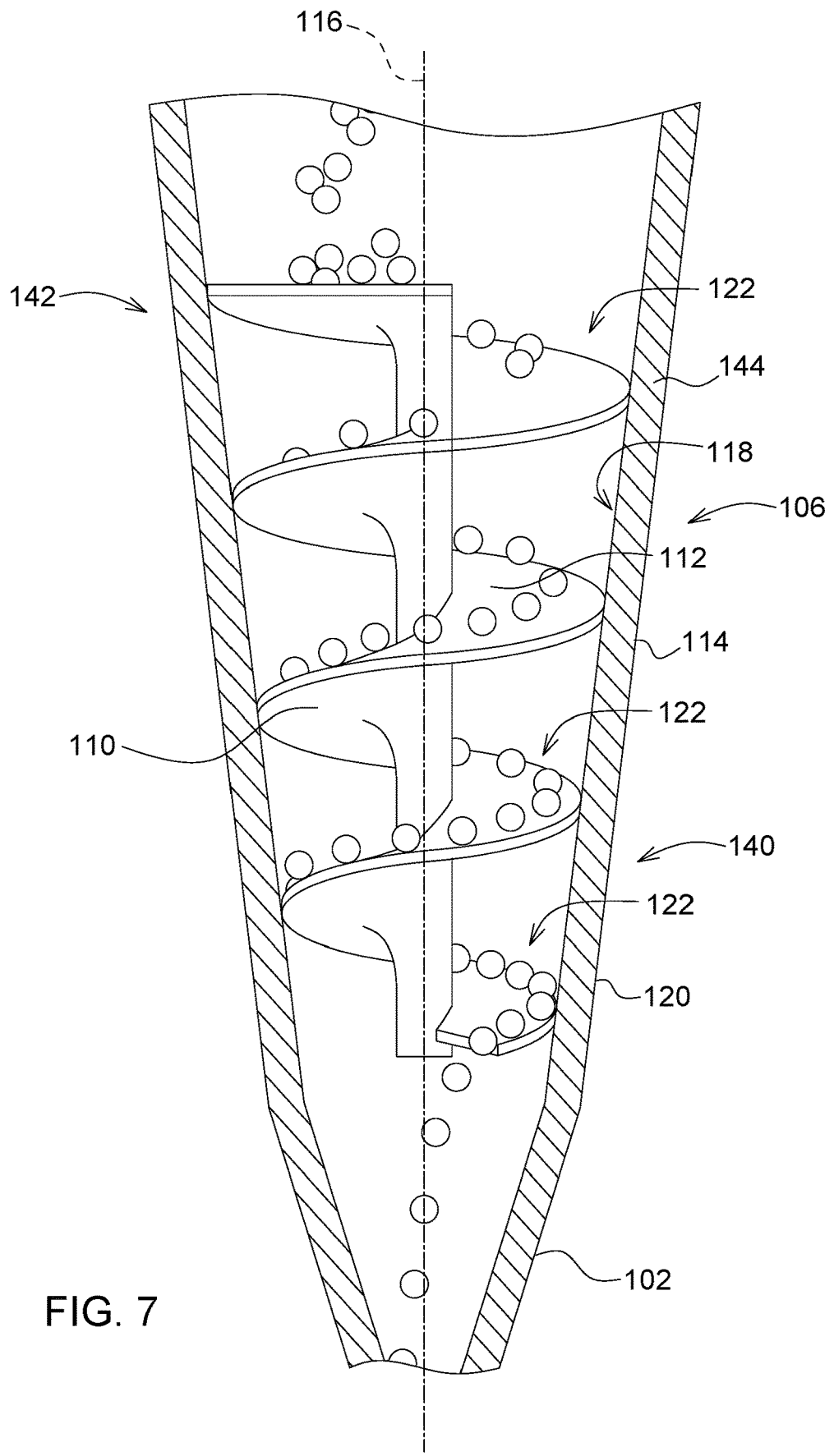
FIG. 7 is a cross-sectional view of a seed positioning device in accordance with one or more embodiments of the present disclosure.

FIG. 7 illustrates an additional embodiment of the present disclosure. The seed positioning device 106 includes a wall 144 tapering inward toward the central axis 116 in a direction of the lower end 140 of the seed positioning device 106. In other words, the wall 144 or other portion of the seed positioning device 106 is wider at the upper end 142 of the positioning device 106 than at the lower end 140. The device 106 of such an embodiment may cause an increase in speed, centrifugal force, and kinetic energy of the seeds 104 to further increase efficiency of alignment and/or separation.

Figure 8:
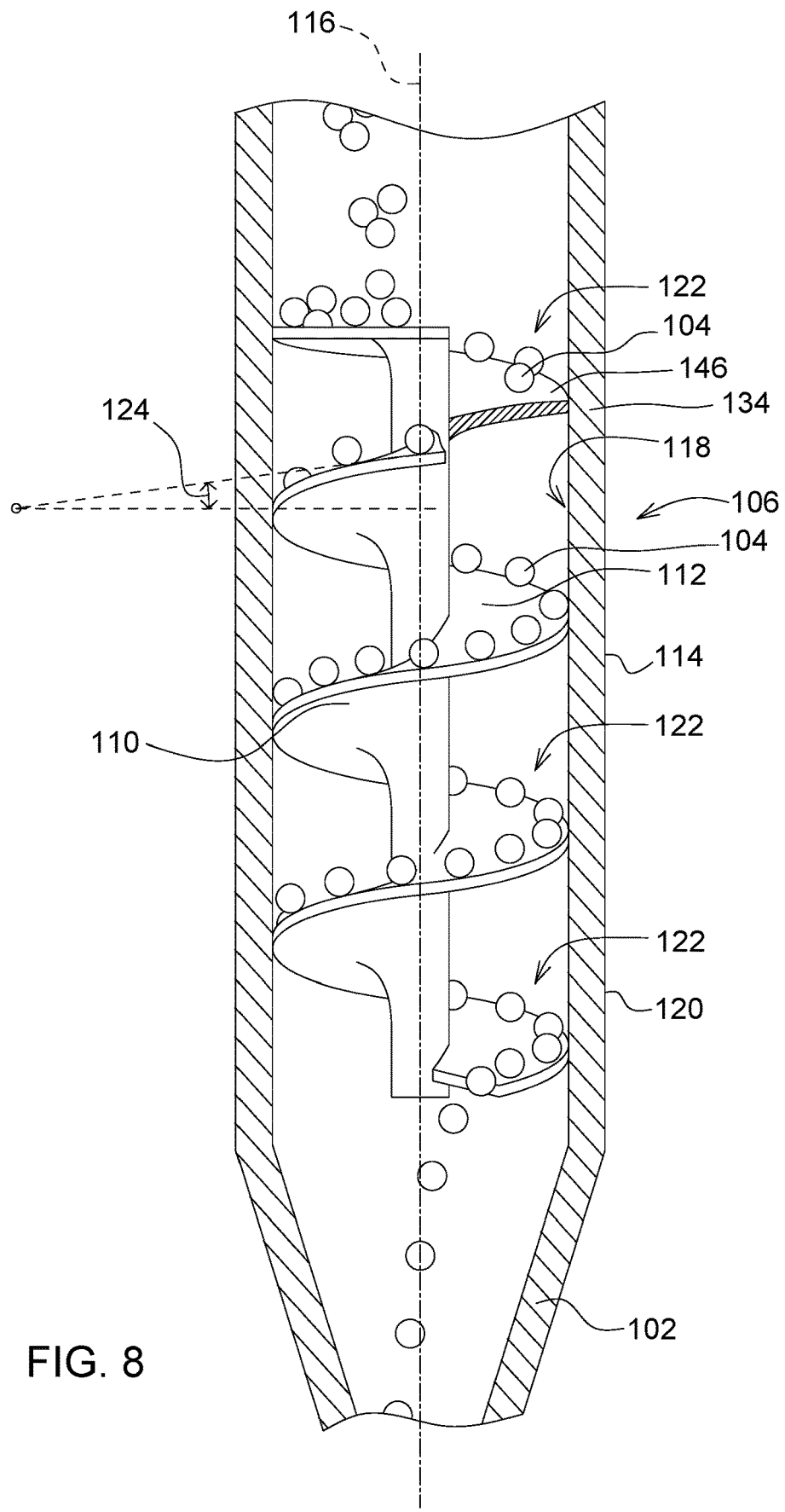
FIG. 8 is a cross-sectional view of a seed positioning device in accordance with one or more embodiments of the present disclosure.
Figure 9:
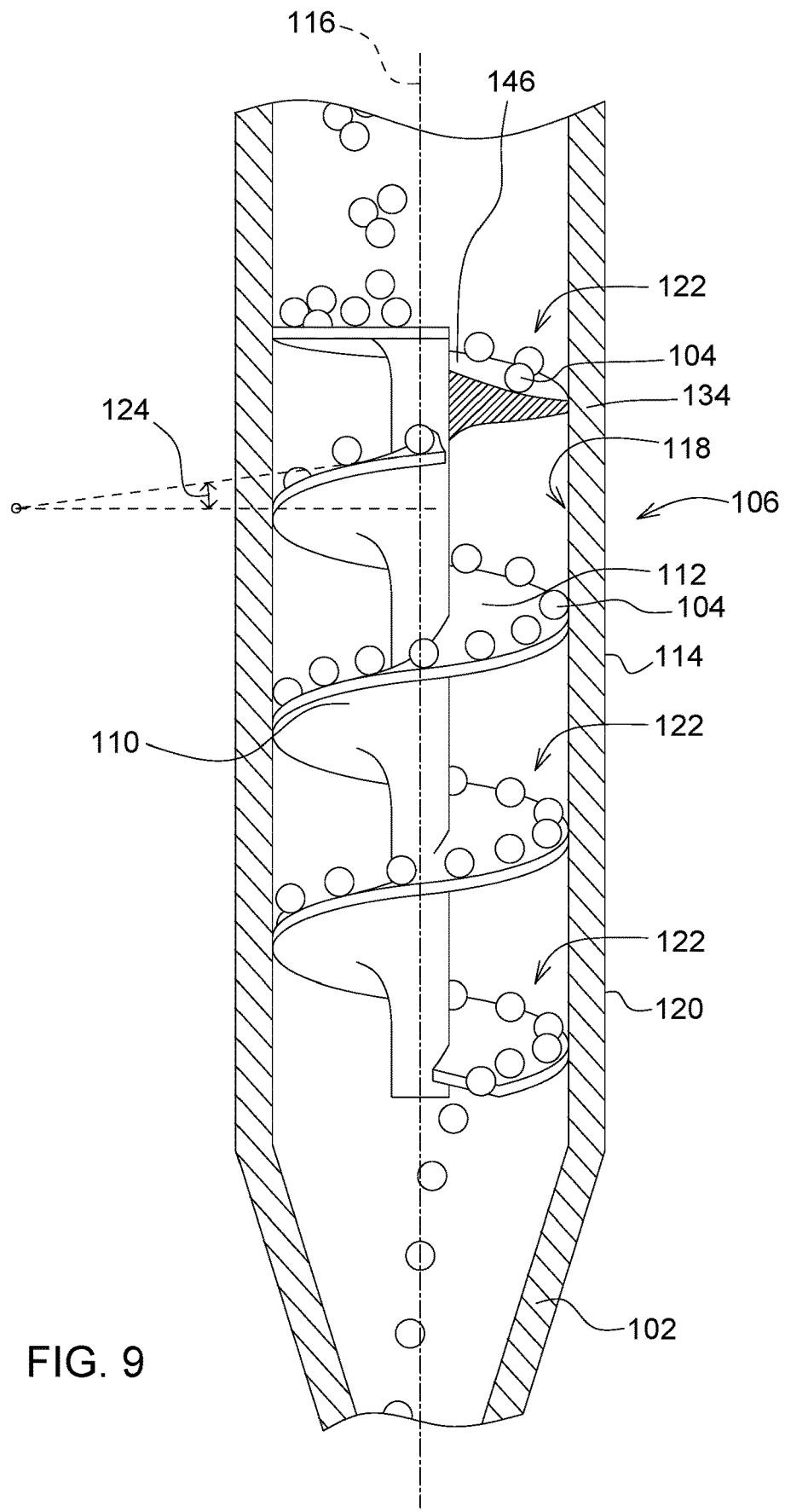
FIG. 9 is a cross-sectional view of a seed positioning device in accordance with one or more embodiments of the present disclosure.

It may be appreciated that the seed positioning device 106 of one or more additional embodiments includes the helical surface 112 having a variety of shapes, contours, and/or other structures for control of the seeds 104 travelling through the device 106. Accordingly, FIGS. 8 and 9 illustrate at least two embodiments showing different helical surface structures. The embodiment of FIG. 8 includes the helical surface 112 having a higher point 146 at a radially outer location adjacent the wall 134. Such an embodiment may delay or resist immediate movement of seeds 104 toward the wall 134. The embodiment of FIG. 9 includes the helical surface 112 having the higher point 146 at a radially inner location adjacent the central axis 116. Such an embodiment may promote or further urge movement of the seeds 104 radially outward in cooperation with centrifugal force applied to the seeds 104. Any two or more embodiments or features disclosed herein may be combined or utilized in a particular embodiment of the device 106 disclosed herein. It may be appreciated that, upon understanding the various embodiments disclosed herein, the seed positioning device 106 and/or the helical surface 112 may include any one or more structures or features to further control movement and/or positioning of the seeds 104 in the device 106.

Figure 10:
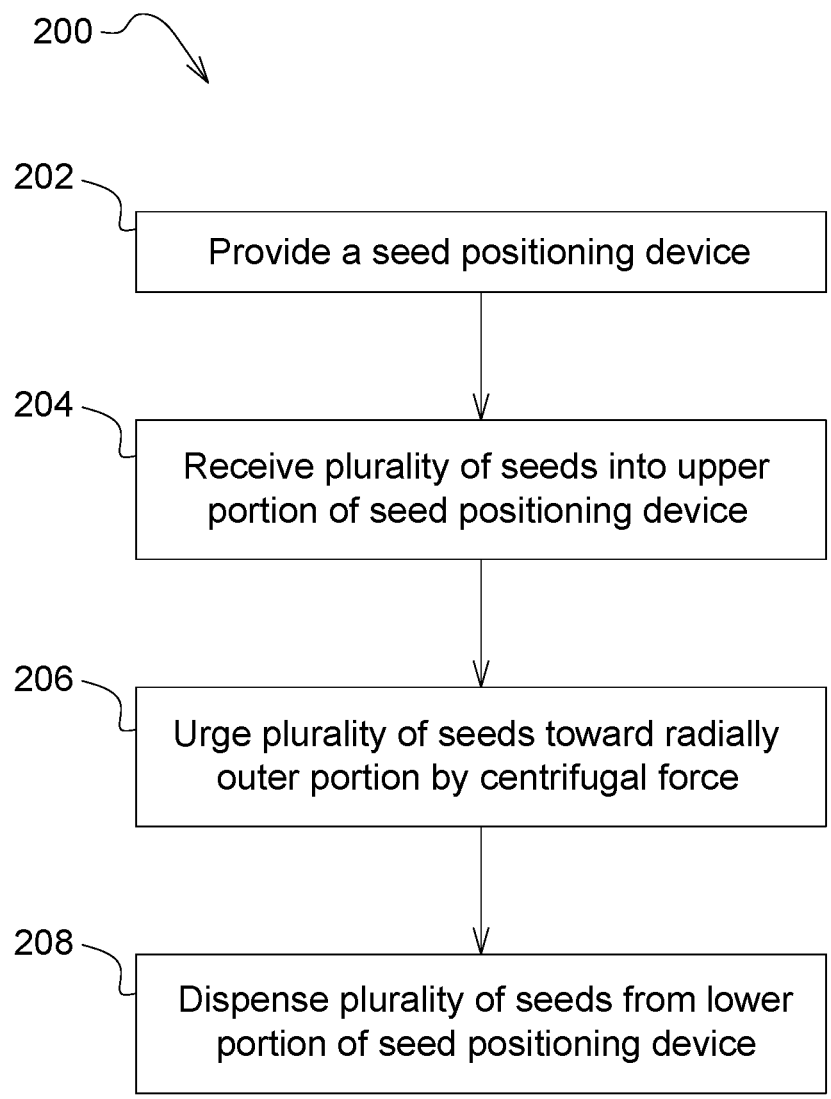
FIG. 10 illustrates a method of positioning a plurality of seeds in accordance with one or more embodiments of the present disclosure.

Referring now to FIG. 10, a method 200 of positioning the seeds 104 is disclosed in accordance with one embodiment of the present disclosure. The method 200 of an embodiment includes providing, at step 202, the seed positioning device 106 having the seed positioning member 110 and the radially outer portion 118. The method 200 of the illustrated embodiment further includes receiving, at step 204, the seeds 104 into the upper portion (e.g., 126) of the seed positioning device 106. The method 200 of the illustrated embodiment further includes urging, at step 206, the seeds 104 toward the radially outer portion 118 by centrifugal force. The method 200 of the illustrated embodiment further includes dispensing, at step 208, the seeds 104 from the lower portion (e.g., 128) of the seed positioning device 106.

The method 200 of additional embodiments includes receiving the seeds 104 by gravity, air, and/or another force into the upper portion (e.g., 126) of the seed positioning device 106. The method 200 of additional embodiments further includes dispensing the seeds 104 by gravity, air, and/or another force from the lower portion (e.g., 128) of the seed positioning device 106. The method 200 of additional embodiments further includes separating the seeds 104 while urging the seeds 104 toward the radially outer portion 118 by centrifugal force. The method 200 of additional embodiments further includes aligning the seeds 104 along the radially outer portion 118 while urging the seeds 104 toward the radially outer portion 118 by centrifugal force. The method 200 of additional embodiments further includes dispensing the seeds 104 from the seed meter 108 into the upper portion (e.g., 128) of the seed positioning device 106. The method 200 of additional embodiments further includes passing the seeds 104 through the seed sensor 102 after dispensing the seeds 104 from the lower portion (e.g., 128) of the seed positioning device 106.

The embodiments of the system 100, device 106, and/or method 200 described herein improve seed volume determination, estimation, and/or counting during seed dispensing or processing operations. Further, the system 100, the device 106, and/or the method 200 provide straightened, aligned, uniform and/or precise positioning and/or placement of seeds and other particulate, such as for passing through the sensor 102 and/or delivering precisely to soil or another location. Even further, the system 100, the device 106, and/or the method 200 accommodate an increased volumetric flow of seed or other particulate that may result from increased speed of efficiency and/or machinery operation.

Notwithstanding the embodiment of the seeding machine 10 illustrated in FIG. 1, the system 100, the device 106, and/or the method 200 may be utilized with any other type of seed, grain, fertilizer, particulate, or granulated product for the purposes of processing or dispensing in accordance with one or more steps or functions described herein. In a non-limiting example, the embodiments described herein may be utilized with a non-air seeding machine, such as a precision planting device, to allow a flow or supply of seeds to be positioned to remove clumps, aligned for precise dispensing and/or planting, and/or spaced or separated in accordance with a desired planting operation. In another non-limiting example, the embodiments described herein may be utilized to allow a flow or supply of non-seed particulates or granules to be positioned to remove clumps, aligned for precise dispensing, and/or spaced or separated in accordance with a desired operation.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A seed positioning device comprising:
   an axially extending housing member having an upper portion and a lower portion; and
   a seed positioning member extending axially through the axially extending housing member and configured to transfer a plurality of seeds between the upper portion of the axially extending housing member and the lower portion of the axially extending housing member and position the plurality of seeds by centrifugal force;
   an upper end configured to cause the centrifugal force to act upon the plurality of seeds to form an upper seed path; and
   a lower end configured to cause the centrifugal force to act upon the plurality of seeds to form a lower seed path;
   wherein the upper seed path comprises a lesser inner radial arc; and
   wherein the lower seed path comprises a greater outer radial arc.

2. The seed positioning device of claim 1, wherein the seed positioning member comprises a helical surface.

3. The seed positioning device of claim 2, wherein the helical surface comprises at least one axially overlapping portion.

4. The seed positioning device of claim 2, wherein the helical surface comprising a pitch angle in a range of between 30 degrees and 60 degrees.

5. The seed positioning device of claim 1, wherein the axially extending housing member comprises a central axis and a radially outer portion, the seed positioning member extending radially from the central axis to the radially outer portion.

6. The seed positioning device of claim 1, wherein the axially extending housing member comprises a tubular portion.

7. A method of positioning a plurality of seeds, the method comprising:
   providing a seed positioning device having a seed positioning member and a radially outer portion;
   receiving the plurality of seeds into an upper portion of the seed positioning device;
   urging the plurality of seeds toward the radially outer portion by centrifugal force;
   causing the centrifugal force to act upon the plurality of seeds to form an upper seed path at an upper end of the seed positioning device, the upper seed path comprising a lesser inner radial arc;
   causing the centrifugal force to act upon the plurality of seeds to form a lower seed path at a lower end of the seed positioning device, the lower seed path comprising a greater outer radial arc that is greater than the lesser inner radial arc; and
   dispensing the plurality of seeds from a lower portion of the seed positioning device.

8. The method of claim 7, wherein receiving the plurality of seeds into the upper portion of the seed positioning device comprises receiving by gravity.

9. The method of claim 7, wherein dispensing the plurality of seeds from the lower portion of the seed positioning device comprises dispensing by gravity.

10. The method of claim 7, further comprising separating the plurality of seeds while urging the plurality of seeds toward the radially outer portion by centrifugal force.

11. The method of claim 7, further comprising aligning the plurality of seeds along the radially outer portion while urging the plurality of seeds toward the radially outer portion by centrifugal force.

12. The method of claim 7, further comprising dispensing the plurality of seeds from a seed meter into the upper portion of the seed positioning device.

13. The method of claim 7, further comprising passing the plurality of seeds through a seed sensor after dispensing the plurality of seeds from the lower portion of the seed positioning device.

14. A method of positioning a plurality of seeds, the method comprising:
   providing a seed positioning device having a seed positioning member and a radially outer portion;
   metering the plurality of seeds with a seed meter;
   dispensing the plurality of seeds from the seed meter into an upper portion of the seed positioning device;
   urging the plurality of seeds toward the radially outer portion by centrifugal force;
   causing the centrifugal force to act upon the plurality of seeds to form an upper seed path at an upper end of the seed positioning device, the upper seed path comprising a lesser inner radial arc;
   causing the centrifugal force to act upon the plurality of seeds to form a lower seed path at a lower end of the seed positioning device, the lower seed path comprising a greater outer radial arc that is greater than the lesser inner radial arc; and dispensing the plurality of seeds from a lower portion of the seed positioning device.

\* \* \* \* \*